United States Patent
Bruinsma et al.

(10) Patent No.: US 6,325,711 B1
(45) Date of Patent: Dec. 4, 2001

(54) TWISTER MECHANISM FOR A SAUSAGE MAKING MACHINE

(75) Inventors: Theo Rein Bruinsma, Rijn (NL); Kenneth Leon Lebsack, Ankeny, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/623,938

(22) PCT Filed: Jan. 10, 2000

(86) PCT No.: PCT/US00/00564

§ 371 Date: Nov. 9, 2000

§ 102(e) Date: Nov. 9, 2000

(87) PCT Pub. No.: WO00/41569

PCT Pub. Date: Jul. 20, 2000

Related U.S. Application Data

(60) Provisional application No. 60/115,624, filed on Jan. 12, 1999.

(51) Int. Cl.[7] .................................................... A22C 11/10
(52) U.S. Cl. ................................................................. 452/47
(58) Field of Search .................................. 452/47, 46, 48

(56) References Cited

U.S. PATENT DOCUMENTS

| | | | |
|---|---|---|---|
| 5,013,279 | * 5/1991 | Southworth | 452/47 |
| 5,064,401 | * 11/1991 | Kasai et al. | 452/47 |
| 5,180,327 | * 1/1993 | Kasai et al. | 452/47 |
| 5,199,921 | * 4/1993 | Townsend | 452/47 |
| 6,132,302 | * 10/2000 | Hiller et al. | 452/47 |

FOREIGN PATENT DOCUMENTS

| | | | |
|---|---|---|---|
| 35 19 021-A | * 11/1986 | (DE) | . |
| 0 399 582-A | * 11/1990 | (EP) | . |
| 0 568 372-A | * 11/1993 | (EP) | . |

* cited by examiner

Primary Examiner—Willis Little
(74) Attorney, Agent, or Firm—Zarley, McKee, Thomte, Voorhees & Sease

(57) ABSTRACT

A twister mechanism for sausage encasing has a first housing member (12) having a center bore. A rotatable ring (22) has a center bore (26) concentric with the center bore of the housing. A rotatable sleeve (24) is mounted on the ring and forms the center bore of the ring and being rotatable with the ring. A second housing member (14) is secured to the first housing member and has a center bore receiving the sleeve. A bearing member extending around the sleeve and extending radially to engage a surface of the second housing member. The ring includes a circular disk (28) extending outwardly from the center bore, and has an outer peripheral edge. A plurality of radially spaced vanes (32A) are on the disk extending outwardly therefrom. The vanes are spaced from the second housing member and the bearing to enhance the cooling of the mechanism when the ring is rotated.

1 Claim, 5 Drawing Sheets

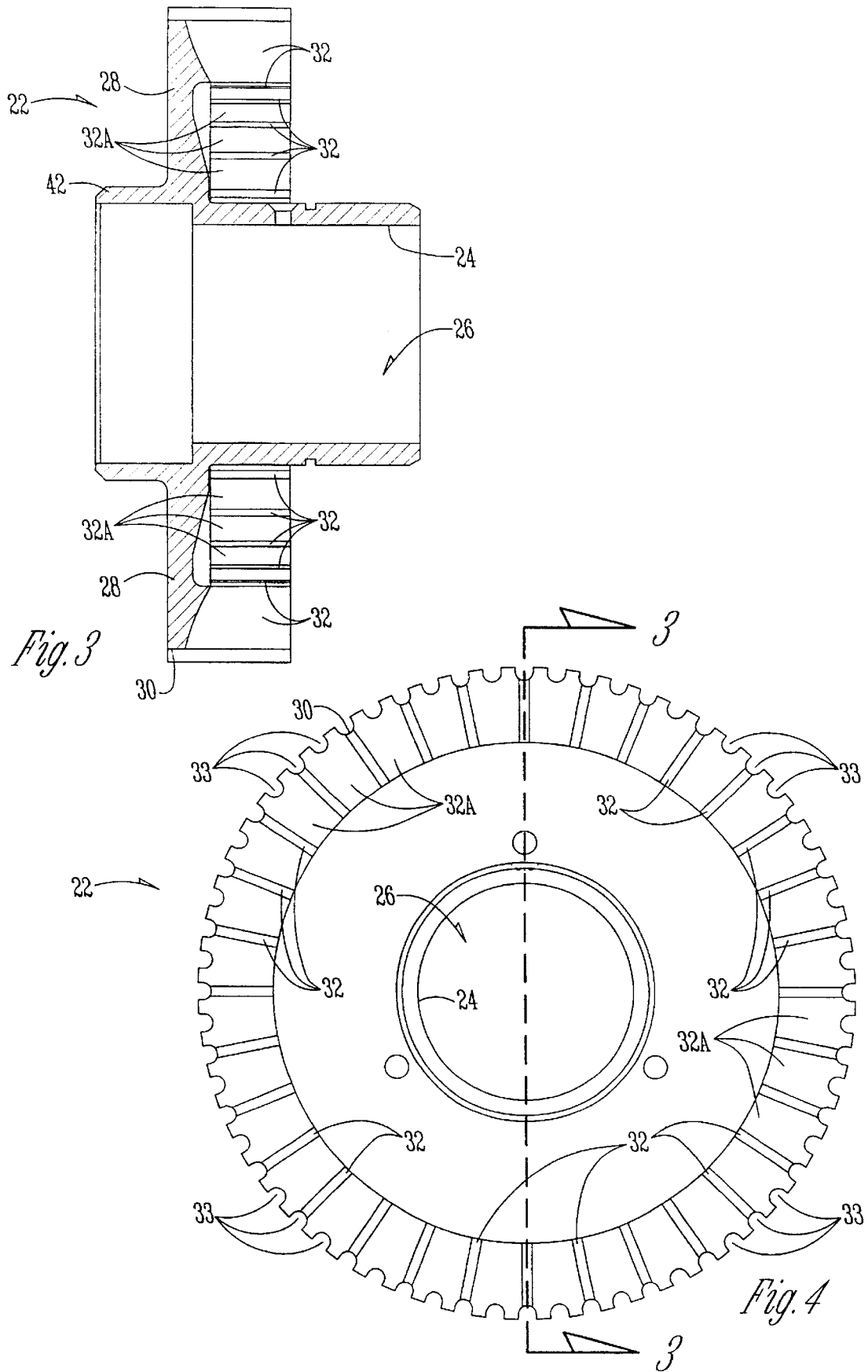

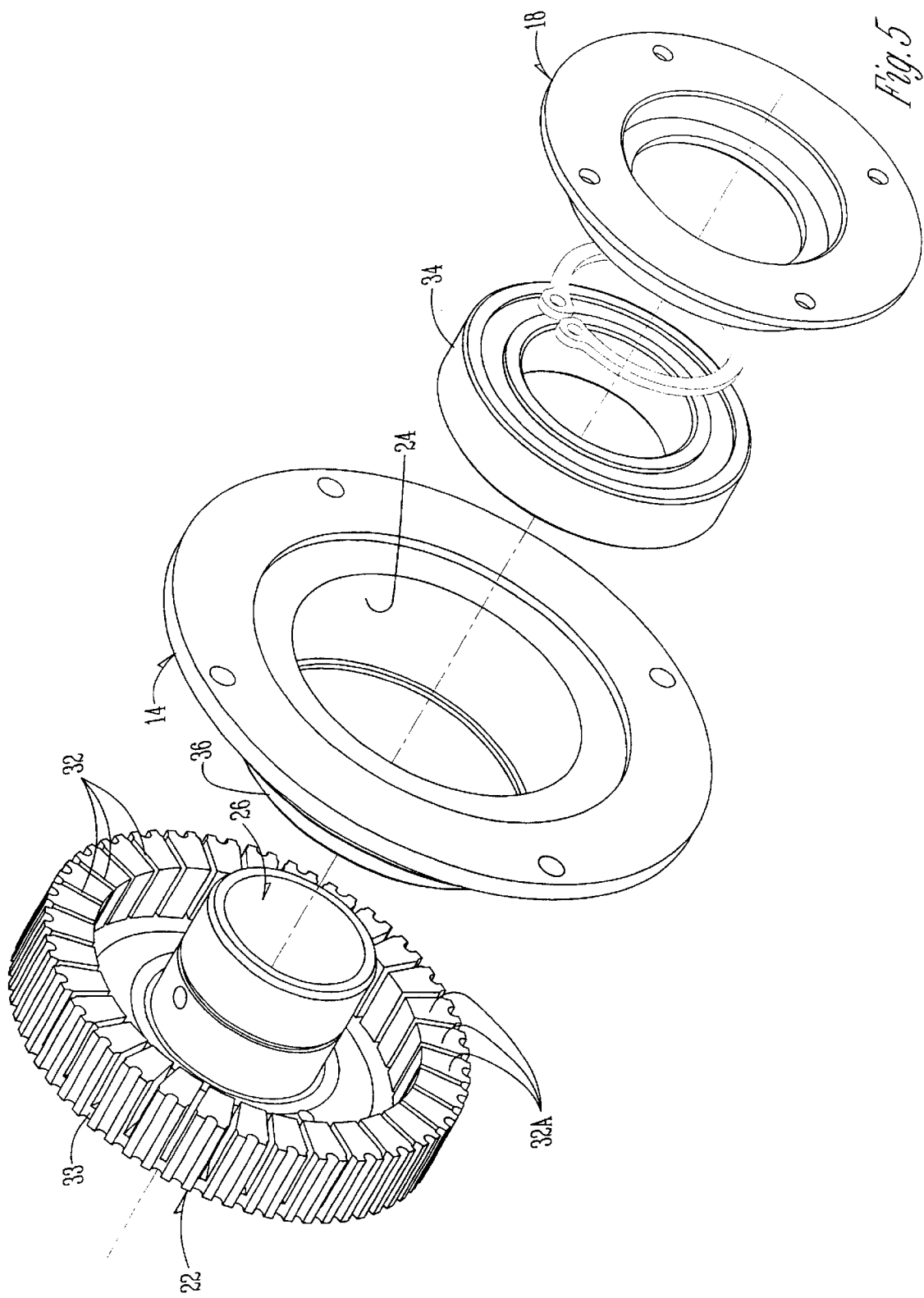

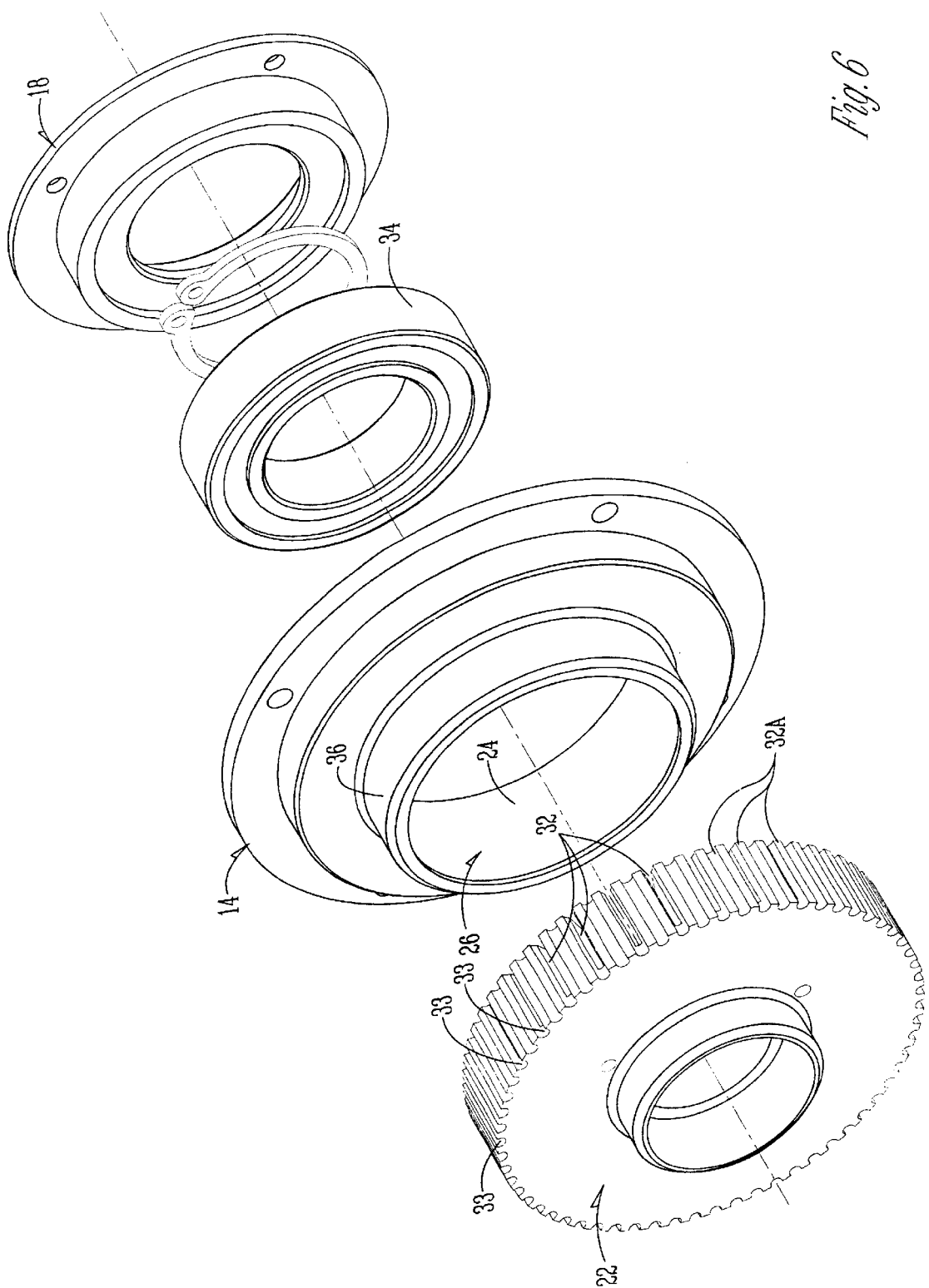

TWISTER MECHANISM FOR A SAUSAGE MAKING MACHINE

This application is based upon the applicants' Provisional application Ser. No. 60/115,624 filed Jan. 12, 1999.

BACKGROUND OF THE INVENTION

Sausage encasing machines extend an extruded encased strand of sausage through a twisting mechanism to impart rotational movement to the strand as the strand exits the twisting mechanism and enters a linking system. This invention involves an improvement in such a twisting mechanism.

Therefore, the principal object of this invention is to provide a twisting mechanism which cools the bearings and other components thereof even while operating at high speed.

SUMMARY OF THE INVENTION

A twister mechanism for sausage encasing has a first housing member having a center bore. A rotatable ring has a center bore concentric with the center bore of the housing. A rotatable sleeve is mounted on the ring and forms the center bore of the ring and being rotatable with the ring. A second housing member is secured to the first housing member and has a center bore receiving the sleeve. A bearing member extending around the sleeve and extending radially to engage a surface of the second housing member. The ring includes a circular disk extending outwardly from the center bore, and has an outer peripheral edge. A plurality of parallel spaced vanes are on the disk extending outwardly therefrom. The vanes are spaced from the second housing member and the bearing to enhance the cooling of the mechanism when the ring is rotated.

DESCRIPTION OF THE DRAWINGS

FIG. 3 is a sectional view through the belt ring of the mechanism; and

FIG. 4 is an elevational view of the belt ring.

FIGS. 5 & 6 are exploded perspective views of the belt ring.

DESCRIPTION OF THE PREFERRED EMBODIMENT

Figure 1:
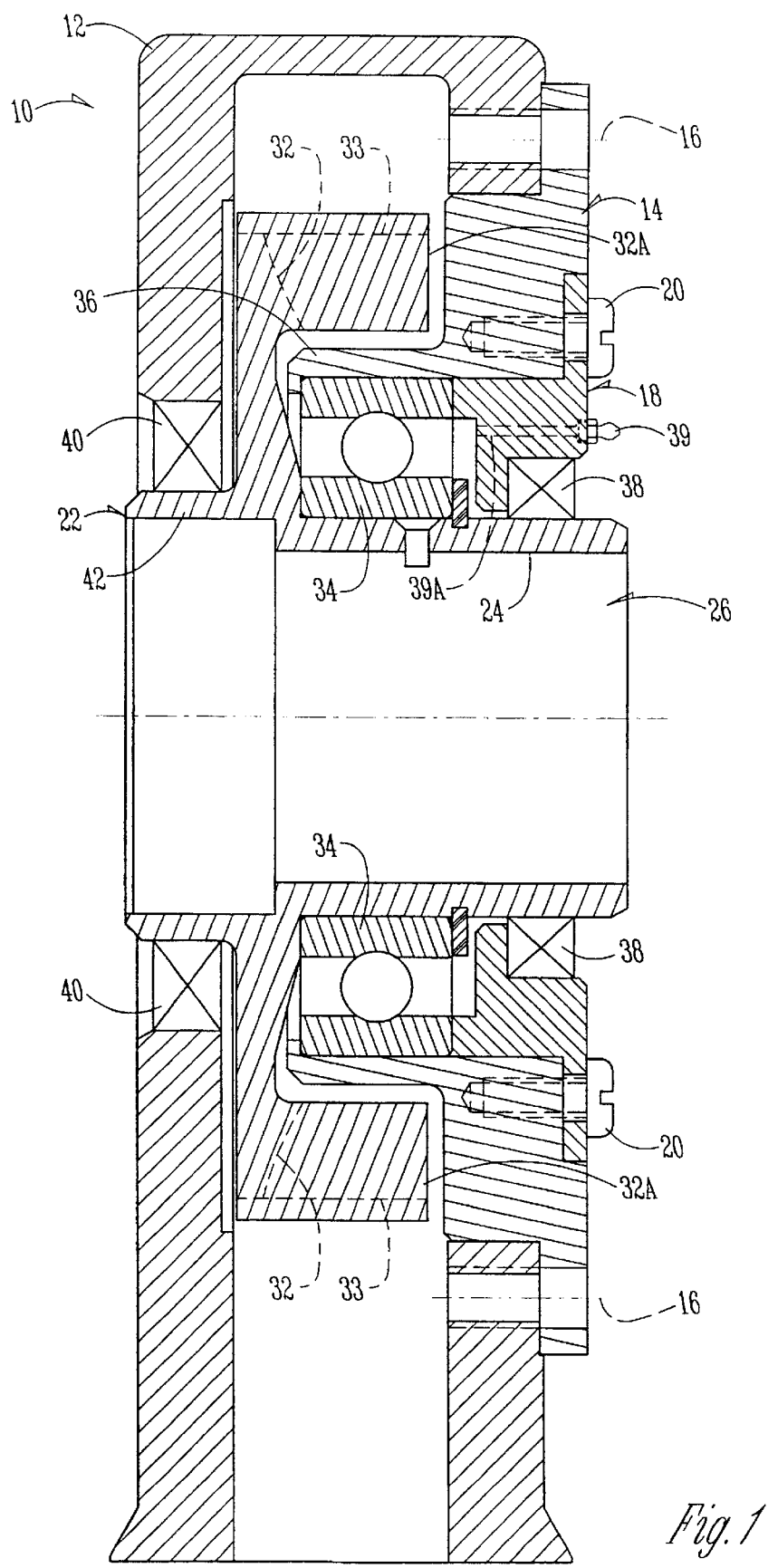
FIG. 1 is a vertical sectional view through the mechanism.
Figure 2:
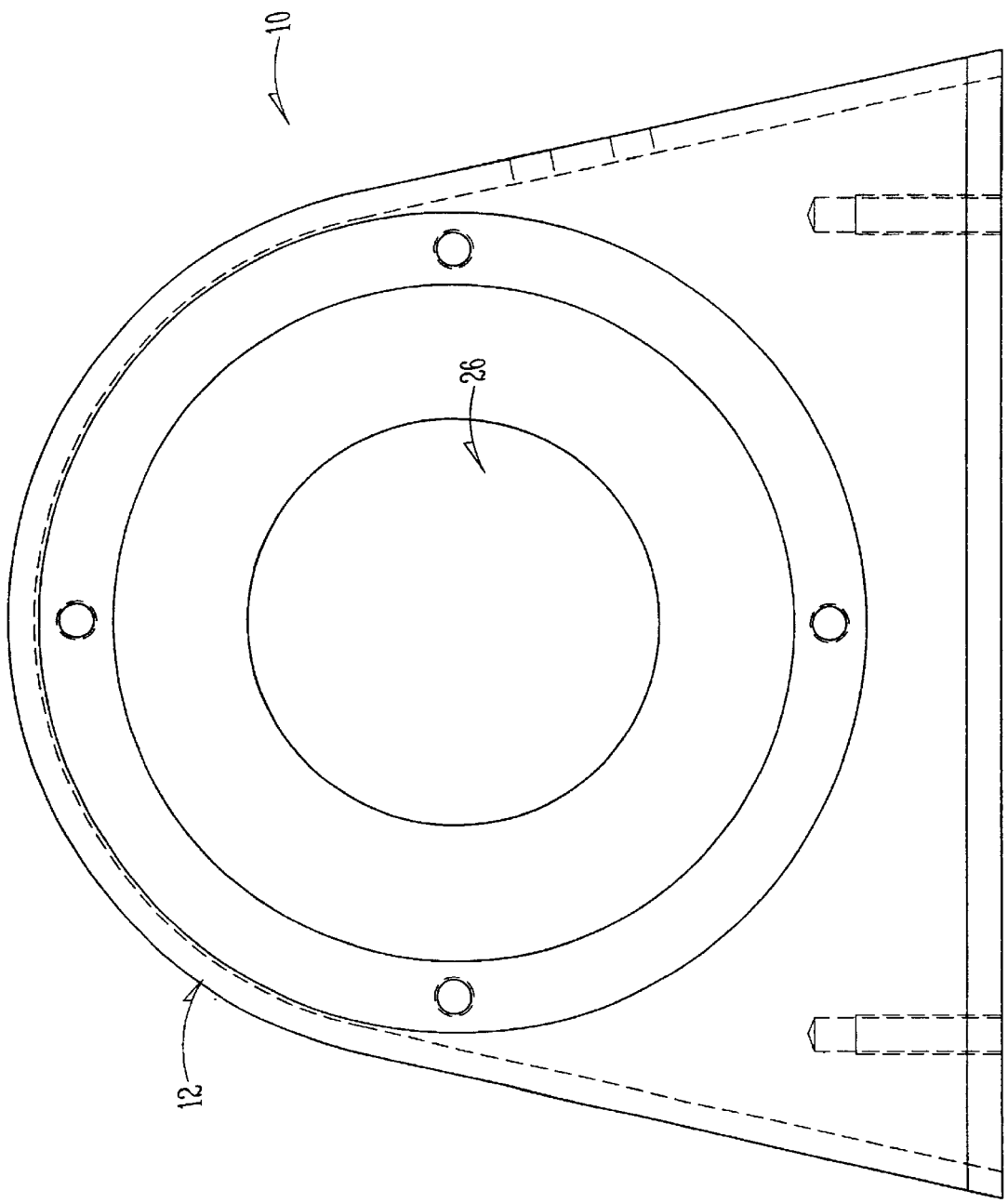
FIG. 2 is a front elevation of the housing.

The twisting mechanism 10 includes a first housing member 12 and a second housing member 14 which are matingly held together by suitable screws (not shown) in aligned threaded apertures 16. A third housing member 18 is secured to second housing member 14 by screws 20.

A toothed belt ring 22 includes a sleeve 24 having a center opening 26, a radially extending disk 28 with an outer perimeter 30. A plurality of spaces 32 separate vanes 32A which extend radially outwardly from disk 28. A series of tooth slots 33 are cut in the periphery 30 of disk 28 to receive teeth on a belt (not shown).

A bearing 34 is mounted around sleeve 24 and extends outwardly to engage an inwardly extending flange 36 on second housing member 14. A seal 38 extends around sleeve 24 and engages third housing member 18. A grease fitting 39 is mounted in housing 18 and communicates with bearing 34 via conduit 39A. (FIG. 1). A seal 40 extends between the center bore of first housing member 12 and flange 42 on ring 22.

A conventional toothed belt (not shown) is threaded around ring 22 so that the teeth of the belt engage notches 33 in the periphery 30 of disk 28 to rotate the ring 22 including sleeve 24 within the housing members 12, 14, and 18. The vanes 32 generate cooling air for the entire mechanism 10. The housings 12, 14 and 18, and ring 22 including sleeve 24 all have concentric center openings.

It is therefore seen that this invention will constitute a much cooler operating twisting function as compared to those of the prior art.

We claim:

1. A twister mechanism for a sausage encasing machine comprising, a first housing member having a center bore, a rotatable ring having a center bore concentric with the center bore of the housing, a rotatable sleeve mounted on the ring forming the center bore of the ring and being rotatable with the ring, a second housing member secured to the first housing member and having a center bore receiving the sleeve, a bearing member extending around the sleeve and extending radially to engage a surface of the second housing member, the ring including a circular disk extending outwardly from the center bore, and having an outer peripheral edge, a plurality of radially spaced vanes on the disk extending outwardly therefrom; the vanes being spaced from the second housing member and the bearing and being adapted to enhance the cooling of the mechanism when the ring is rotated.

* * * * *